United States Patent [19]
Kubo

[11] 3,712,234
[45] Jan. 23, 1973

[54] CONVEYOR TYPE TRANSPORT DEVICE

[75] Inventor: Moritada Kubo, Shibuya-ku, Tokyo, Japan

[73] Assignee: Tokyo Shibaura Electric Co., Ltd., Kanasaki-shi, Japan

[22] Filed: Jan. 19, 1971

[21] Appl. No.: 107,815

[30] Foreign Application Priority Data

Jan. 22, 1970    Japan ................................45/5430
    Jan. 22, 1970    Japan ................................45/5431

[52] U.S. Cl.....................................104/25, 198/110
[51] Int. Cl............................B65b 9/12, B65g 21/12
[58] Field of Search......104/18, 25, 134; 198/16 MS, 198/76, 110, 181

[56] References Cited

UNITED STATES PATENTS

| | | | |
|---|---|---|---|
| 3,565,238 | 2/1971 | Candela | 104/25 |
| 1,671,207 | 5/1928 | Parlongue | 104/25 |
| 3,238,893 | 3/1966 | Zuppiger | 104/18 |
| 1,718,085 | 6/1929 | Sene | 104/25 |

*Primary Examiner*—Gerald M. Forlenza
*Assistant Examiner*—D. W. Keen
*Attorney*—Flynn & Frishauf

[57] ABSTRACT

A conveyor type transport device comprising a passageway movable in the form of an endless loop divided into a plurality of segments capable of expansion and contraction; segment length control means for varying said length by changing the distance between a pair of members fitted to both ends of the segment; electric motor devices provided in the same number as the segment length control means and made to move along said looped movable passageway while supporting it from below in coupled relationship with said control means; and a looped track for said motor devices, wherein the segment length control means is so designed as to cause an object placed at a particular point on the movable passageway to be carried along at a different speed from the average speed of said passageway with the entire length of the loop kept unchanged.

12 Claims, 9 Drawing Figures

PATENTED JAN 23 1973

CONVEYOR TYPE TRANSPORT DEVICE

BACKGROUND OF THE INVENTION

The present invention relates to a transport device having a conveyor type movable passageway and more particularly to a conveyor type transport device wherein an object placed at a particular point on said passageway is carried along at a different speed from the average speed of said passageway.

With a general transport device equipped with a movable passageway such as a conveyor or escalator, the average speed of the movable passageway can be freely selected, but it is impossible to cause an object placed at a particular point on the movable passageway to be carried along at a freely chosen speed independently of said average speed. However, it is sometimes desired, for example, to couple a first conveyor with another conveyor or automatic machine operated at a different speed from that of the first conveyor. If, in such case, an object carried by the first conveyor is made to travel through the juncture of both transport means at the same speed at which the succeeding conveyor or automatic machine is operated, then there will be offered great advantage. With an endless movable passageway carrying, for example, passengers, it is preferred that the part of said passageway at which passengers get on be moved slowly, the intermediate stretch be operated at a greater speed and the part at which they get off be again moved slowly. To date, however, such conveyor type transport devices are not available.

It is accordingly the object of the present invention to provide an endless conveyor type transport device wherein an object placed at a particular point on the movable passageway of such device is carried at a different speed from the average speed of the movable passageway.

SUMMARY OF THE INVENTION

According to the present invention, the movable passageway assumes a loop form divided into a plurality of segments capable of expansion and contraction. The segment may be formed of a flexible rubber band or combined metal bars. Each segment is provided with segment length control means for varying said length by changing the distance between a pair of members fitted to both ends of the segment. There are further provided a plurality of motor devices each coupled with said segment length control means and made to travel on their track while supporting the looped movable passageway from below. The motor devices are designed to move along the looped movable passageway at the same speed as their average speed. The segment length control means is so designed as to cause an object placed at a particular point on the movable passage to be carried along at a different speed from the average speed of said passage with the entire length of the loop kept unchanged. Namely, if each segment gradually contracts itself while an object placed thereon is forwarded at the average speed of the movable passageway, then the object will travel more slowly. Conversely, in case the segment is progressively extended, the object will be carried more quickly. Accordingly, the transported object is conveyed at locally varying speed.

DETAILED DESCRIPTION OF THE INVENTION

Figure 1:
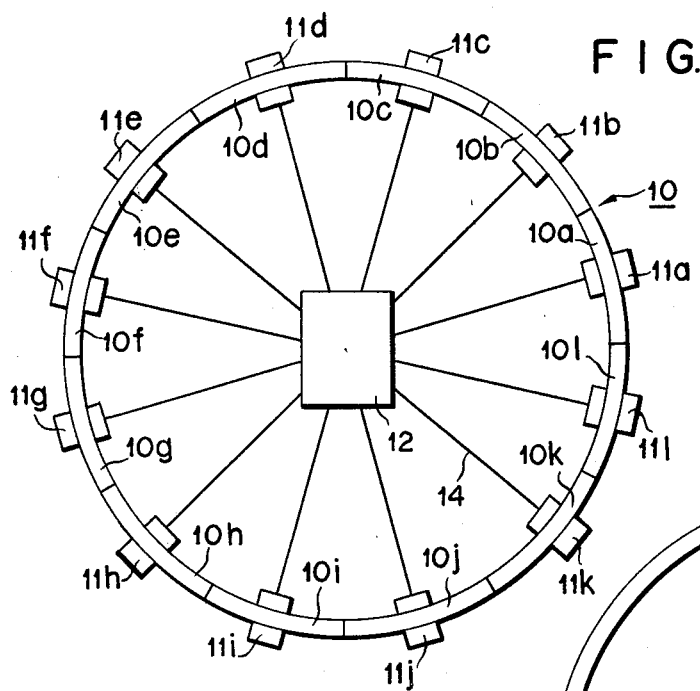
FIG. 1 is a plan view of a transport device according to an embodiment of the present invention provided with an endless movable passageway indicated in annular form, showing the relative positions of a plurality of flexible segments and electric motor devices provided therefor.
Figure 2:
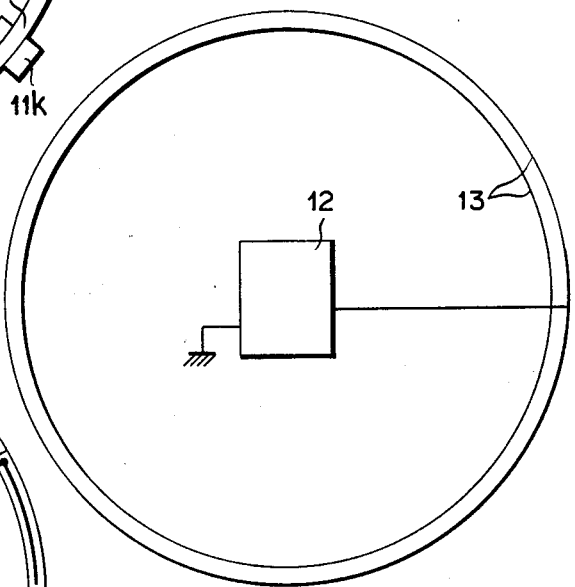
FIG. 2 is a plan view of the track of the motor devices of FIG. 1.
Figure 3:
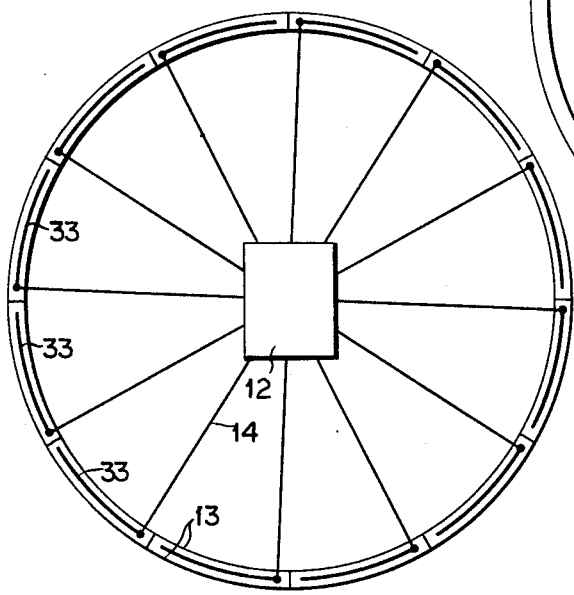
FIG. 3 is a plan view of a motor track according to another embodiment of the invention.

Referring to FIG. 1, number 10 generally denotes a conveyor type movable passageway which is fabricated in the form of an annular loop consisting of 12 segments 10a to 10l capable of expansion and contraction. Each segment is provided with a later described segment length control means which includes a control signal generator 12 and electric motor devices 11a to 11l. The segment is supported by the motor device through the segment length control means. The motor device 11 travels counterclockwise on two rails conducted by the control signal generator 12. Now let it be assumed that an object placed on the segment passing the segment 10a position shown in FIG. 1 is carried counterclockwise to a given point on the segment 10f position shown in FIG. 1 and that the object moves slowly through a region corresponding to the segment 10a in FIG. 1, quickly through the regions of the intermediate segments and again slowly through the region of the segment 10f position in FIG. 1. Accordingly, while passing through a space represented by the segment 10a in FIG. 1, the segment is contracted in length, causing the object placed thereon to move slowly. Then the segment is shifted to the succeeding segment 10b position shown in FIG. 1, the segment has its length extended, allowing the object thereon to be carried more quickly. When the segment passes through the space corresponding to the segments 10c and 10d in FIG. 1, the segment attains a maximum speed. When the segment is carried through the regions represented by the segments 10e and 10f in FIG. 1, the segment is contracted in length to cause the object thereon to travel again slowly. The control signal generator 12 supplies control signals to the segment length control means supported by the motor device 11 through a signal line 14.

Figure 4:
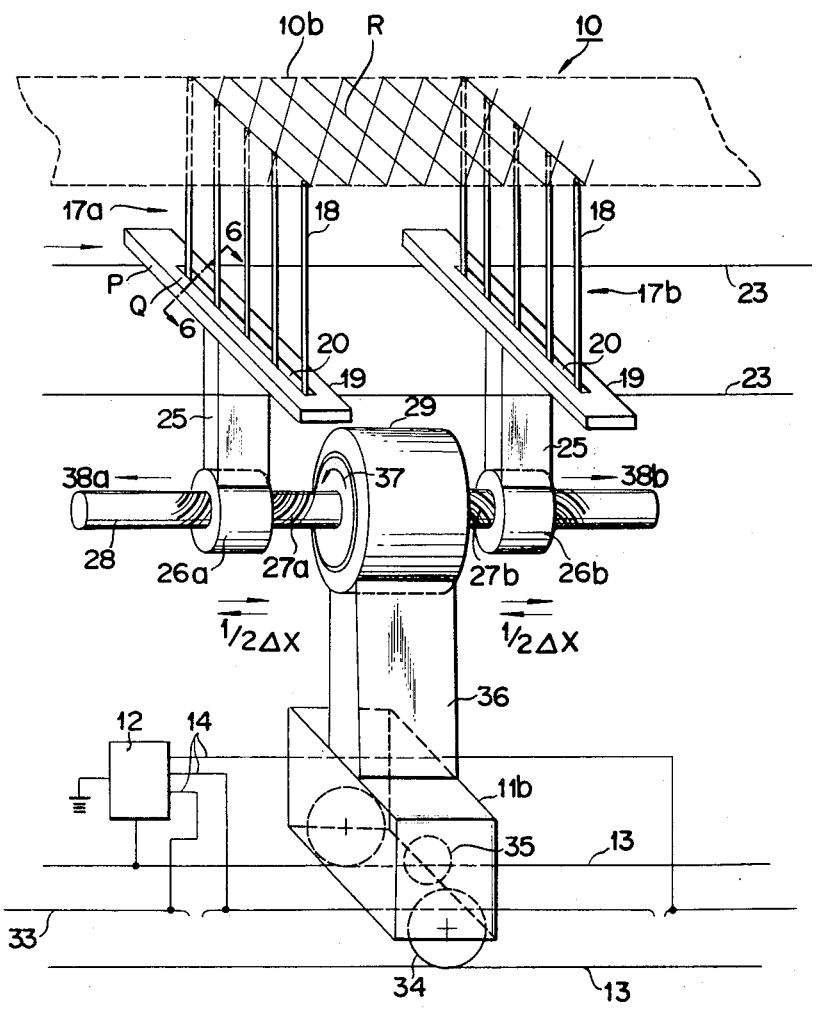
FIG. 4 is a perspective view of segment length control means associated with one segment of FIG. 1 according to an embodiment of the invention.
Figure 6:
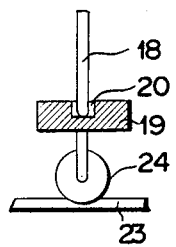
FIG. 6 is an enlarged sectional view on line 6—6 of the Q section of FIG. 4.
Figure 7:
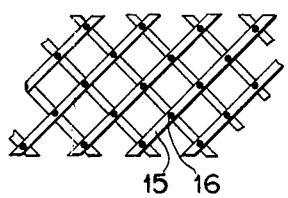
FIG. 7 is an enlarged plan view of the R section of FIG. 4.

The arrangement of segment length control means according to an embodiment of the present invention is illustrated in FIG. 4. Where the movable passageway 10 is sufficiently long the individual segments may be deemed to assume a linear shape. In FIG. 4, therefore, segment, for example, 10b is shown in a linear form. Each segment comprises, as shown in FIG. 7, a plurality of ribbon-shaped members 15 loosely riveted at the intersection so as to have their assembly as a whole expanded or contracted in the direction of the movable passageway. Near to both ends of the section 10b (the same applies with the other segments) are fitted a pair of members 17a and 17b. Changing of the distance therebetween causes the segment 10b to be varied in length. The member 17a has, for example, five bars 18 loosely joined by rivet 16 (FIG. 7) at the upper ends (The bar length is shown in exaggerated form.). The lower or free end of the bar is movably fitted into the slit 20 of a plate member 19 (FIG. 6).

Figure 5:
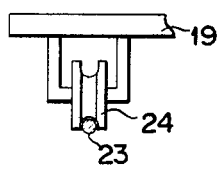
FIG. 5 is an enlarged side view of the P section of FIG. 1 as viewed in the direction of the arrow.

Numeral 23 represents a guide track parallel with the movable passageway 10. The plate member 19 is carried on a roller 24 (FIG. 5) to travel smoothly on the track 23, and is supported by means of an arm 25 mounted on a nut 26a. The other member 17b has the same construction and is provided with a nut 26b. Into these nuts 26a and 26b is inserted a revolving shaft 28 whose halves constitute screw sections 27a and 27b threaded in opposite directions. Said shaft 28 acts as the revolving shaft of the motor 29.

Along the two rails 13 parallel with the movable passageway 10 are disposed signal lines 33 in electrically disconnected relationship from each other and in the same number as the segments of said passageway 10. These signal lines 33 are connected to the control signal generator 12 through the signal lines 14 of FIG. 1. The control signal generator 12 may contain a power source for supplying power to one of the two rails 13. The motor device 11 has wheels 34 (FIG. 4) with which to run on the rails 13 and is driven by a motor 35 supplied with power through one of the rails 13. The motor device 11b (FIG. 4) supports the motor 29 by means of an arm 36. The motor 29, for example, a pulse motor is supplied with control signals through the signal line 33 by sliding contact means (not shown) so as to rotate its shaft 28 in the desired direction and the prescribed number of revolutions. Referring to FIG. 4, when the revolving shaft 28 rotates in the direction of the arrow 37, then the nut 26a moves in the direction of the arrow 38a and the nut 26b in the direction of the arrow 38b, and vice versa. Accordingly, the expansion or contraction of the segment 10b can be controlled according to signals supplied to the signal line 33. The motor 29 may be a servo type motor.

When a given segment is varied in length, it is necessary that another segment be correspondingly varied in length so as to maintain the prescribed length of the movable passageway 10 and also the motor devices be made to travel on their track at the same speed as the preset average speed of the movable passageway.

Figure 9:
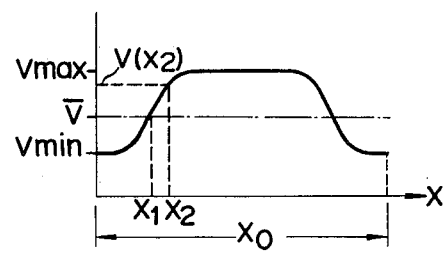
FIG. 9 shows the distribution of the speed of an object on the movable passageway.

FIG. 9 represents the distribution curve 39 of the speed of an object placed on the movable passageway. The total length of the movable passageway is designated as $X_0$ and the average speed thereof as $\overline{V}$. Assuming that the segment 10b shows a length change $\Delta X$ from $X_1$ to $X_2$ (the case of expansion) and there is required a length of time $\Delta t$ for said expansion, then variation $\Delta V$ in the speed of an object placed in the segment 10b may be expressed as $\Delta X/\Delta t$. Therefore, the speed $V(X_2)$ at point $X_2$ may be indicated by the following equation:

$$V(X_2) = \overline{V}(X_1) + \int_{X_1}^{X_2} \Delta V(X) \cdot dX \quad (1)$$

Thus the average speed of the movable passageway may be indicated as follows:

$$\overline{V} = ( \int V(X) \cdot dX)/X_0 \quad (2)$$

Namely, the speed of the object at point $X_2$ can be increased over the average speed $\overline{V}$ of the movable passageway. The foregoing description relates to the case where the segment 10b was expanded. It will be apparent that when the segment 10b contracts itself the object will be made to travel more slowly than the average speed $\overline{V}$ of the movable passageway. Thus, the object placed at a given point on the movable passageway can be conveyed at locally varying speed falling within the range of $V_{max}$ and $V_{min}$.

Figure 8:
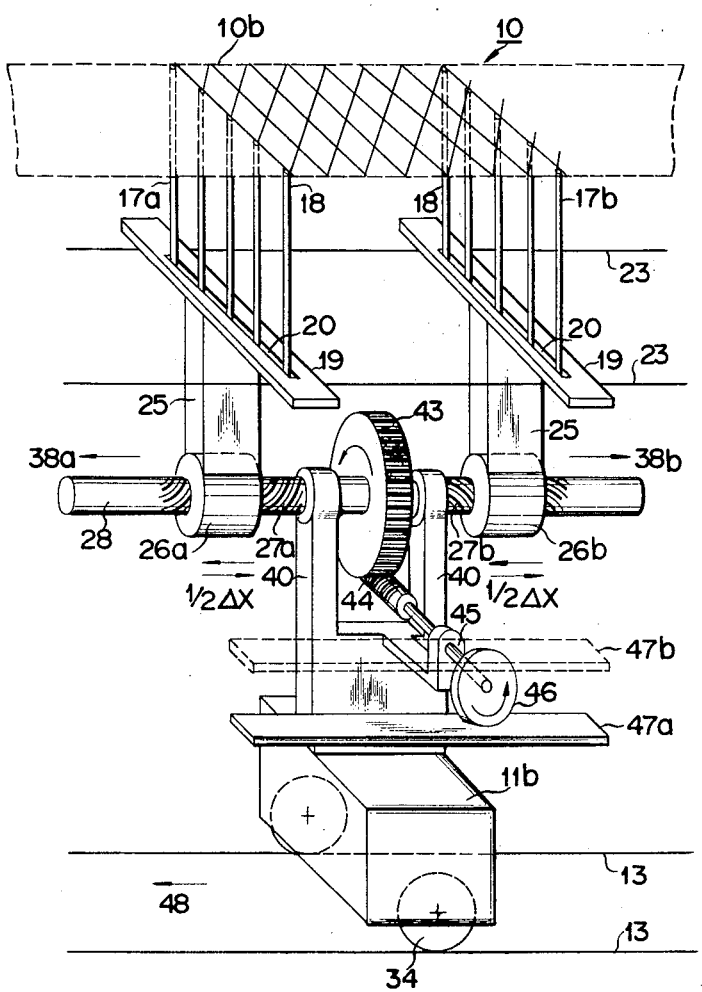
FIG. 8 is a perspective view of segment length control means according to another embodiment of the invention.

FIG. 8 indicates the construction of segment length control means according to another embodiment of the invention. The same parts of this embodiment as those of the preceding one are denoted by the numerals given in FIG. 4, and description thereof is omitted. The revolving shaft 28 is rotatably supported by two arms 40 fixed to the motor device 11b and is made to rotate by a worm wheel 43 fixed to said shaft 28. The revolving shaft of a worm 44 is rotatably supported by a support member 45 and fitted at the end with a friction wheel 46. The friction wheel 46 contacts a stationary friction plate 47a. When the motor device 11b, for example, travels in the direction of the arrow 48, the friction wheel 46 and worm wheel 43 rotate counter-clockwise, causing the nuts 26a and 26b to be moved in the direction of the arrows 38a and 38b respectively with the resulting expansion of the segment 10b. At a prescribed spatial point through which the motor device 11b passes to contract the segment 10b, there is so fixed another friction plate 47b as to contact the indicated upper periphery of the friction wheel 46. When, under such condition, the motor device advances in the direction of the arrow 48, the friction wheel 46 and worm gear rotate in the opposite direction to the preceding case with the resulting contraction of the segment 10b. The friction wheel 46 and friction plates 47a and 47b may be replaced by a gear or rack and a plate provided with teeth or a pinion engageable with those of said gear. Further the aforesaid worm wheel 43 and worm 44 may be replaced by a combination of other gears. In the embodiment of FIG. 8, the signal lines 33 may be omitted.

Over a segment which happens to be of such construction as illustrated in FIG. 7, there may be stretched a rubber band with both ends fixed. Further, the structural member of FIG. 7 itself may be replaced by such rubber band.

The foregoing embodiments relate to the case where the movable passageway assumed an annular form. However, said form may be changeable, depending upon application of the system.

What is claimed is:

1. A conveyor type transport device comprising:

a movable passageway in the form of an endless loop divided into a plurality of segments, each segment being expansible and contractible in length in the same direction as the direction of movement of said endless loop;

a looped track for defining the path of travel of said passageway;

electric motor devices provided in the same number as the number of segments and coupled to respective segments and to said track, said motor devices driving said segments along said track;

pairs of movable members respectively fixed to respective segments adjacent each end of said segments; and segment length control means coupled to said pairs of movable members for selectively varying the lengths of said segments by selectively changing the distance between movable members of said pairs of movable members, to cause an object placed at a particular point on the movable passageway to be carried along at a different speed from the average speed of said passageway with the entire length of the loop kept unchanged.

2. The conveyor type transport device according to claim 1 wherein segment length control means comprises:

a plurality of signal transmission line means in electrically disconnected relationship from each other and being provided in the same number as the number of said segments and being located along the path of said looped movable passageway; and segment length varying means at each segment, each of said length varying means comprising:

first and second screw-threaded members coupled respectively to a pair of said movable members;

a revolving shaft coupled with said first and second screw-threaded members and having portions thereof so screw-threaded as to cause said first and second screw-threaded members, and said movable members, to move in the opposite direction upon rotation of said revolving shaft; and a motor receiving signals from a respective signal transmission line means for rotating said revolving shaft responsive to said signals.

3. The conveyor type transport device according to claim 2 wherein said movable members extend substantially vertically from the ends of said segments and are coupled to respective screw-threaded members.

4. The conveyor type transport device according to claim 1 wherein said electric motor devices ride on said looped track below said movable passageway, said electric motor devices supporting said movable passageway.

5. The conveyor type transport device according to claim 1 wherein said segment length control means expands the length of a first segment while simultaneously contracting the length of another segment, thereby maintaining the entire length of the loop unchanged.

6. The conveyor type transport device according to claim 1 wherein the segment length control means comprises:

first and second screw-threaded members at each segment coupled respectively to a pair of said movable members;

a revolving shaft at each segment and coupled with said first and second screw-threaded members and having portions thereof so screw-threaded as to cause said first and second screw-threaded members, and said movable members, to move in the opposite directions upon rotation of said revolving shaft;

a revolving disc member at each segment fixed to the respective revolving shaft; and means for selectively rotating the revolving disc members in a prescribed direction in response to the travel of said segment to a predetermined position along the path of travel of said passageway, to thereby rotate the respective revolving shaft.

7. The conveyor type transport device according to claim 6 wherein said means for selectively rotating the revolving discs comprise a plurality of plates located at pre-determined positions along the path of said passageway for selectively engaging said revolving disc members to rotate same.

8. The conveyor type transport device according to claim 7 including at least a first plate located above the revolving disc members for engaging the top peripheral surface of the revolving disc members, and at least a second plate located below said revolving disc members for engaging a lower peripheral surface of said revolving disc members.

9. The conveyor type transport device according to claim 7 wherein said plates are friction plates for frictionally engaging said revolving disc members.

10. The conveyor type transport device according to claim 6 wherein said movable members extend substantially vertically from the ends of said segments and are coupled to respective screw-threaded members.

11. The conveyor type transport device according to claim 6 wherein said electric motor devices ride on said looped track below said movable passageway, said electric motor devices supporting said movable passageway.

12. The conveyor type transport device according to claim 6 wherein said segment length control means expands the length of a first segment while simultaneously contracting the length of another segment, thereby maintaining the entire length of the loop unchanged.

* * * * *